United States Patent
Matsumoto

(10) Patent No.: US 9,503,373 B2
(45) Date of Patent: Nov. 22, 2016

(54) CONTROL METHOD BY RECEIVING DEVICE, RECEIVING DEVICE, AND COMMUNICATION SYSTEM

(71) Applicant: FUJITSU LIMITED, Kawasaki-shi, Kanagawa (JP)

(72) Inventor: Yuji Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 14/593,125

(22) Filed: Jan. 9, 2015

(65) Prior Publication Data

US 2015/0237562 A1    Aug. 20, 2015

(30) Foreign Application Priority Data

Feb. 14, 2014 (JP) ................. 2014-026099

(51) Int. Cl.
*H04W 40/02* (2009.01)
*H04L 12/743* (2013.01)
*H04L 12/707* (2013.01)

(52) U.S. Cl.
CPC ................. *H04L 45/7453* (2013.01)

(58) Field of Classification Search
CPC . H04L 45/7453; H04L 45/00; H04L 45/745; H04L 41/00; H04L 41/065; H04L 41/0816; H04L 45/34; H04L 45/502; G06F 17/30073; H04W 60/00; H04W 8/26
See application file for complete search history.

(56) References Cited

U.S. PATENT DOCUMENTS

| 5,555,542 A | 9/1996 | Ogura et al. |
| 2011/0002336 A1* | 1/2011 | Saeki .................. H04L 45/00 370/392 |
| 2011/0016132 A1* | 1/2011 | Okamoto .......... G06F 17/30073 707/747 |
| 2013/0003736 A1* | 1/2013 | Szyszko ............ H04L 47/2441 370/392 |

FOREIGN PATENT DOCUMENTS

| JP | 04-205543 | 7/1992 |
| JP | 2006-215735 | 8/2006 |
| WO | 92/22972 | 12/1992 |

* cited by examiner

*Primary Examiner* — Awet Haile
(74) *Attorney, Agent, or Firm* — Fujitsu Patent Center

(57) ABSTRACT

A receiving device associates a first one-way function value determined by an operation using a one-way function with a first destination. Next, the receiving device determines a second one-way function value by the operation using the one-way function from identification information stored in the receiving device and element information received from a transmitting device. When the second one-way function value is different from the first one-way function value, the receiving device associates the second one-way function value with a second destination, and returns the identification information to the transmitting device.

9 Claims, 16 Drawing Sheets

| INDEX | DESTINATION ELEMENT |
|---|---|
| I1 | D1 |
| I2 | D2 |
| ⋮ | ⋮ |
| In | Dn |

F I G. 2

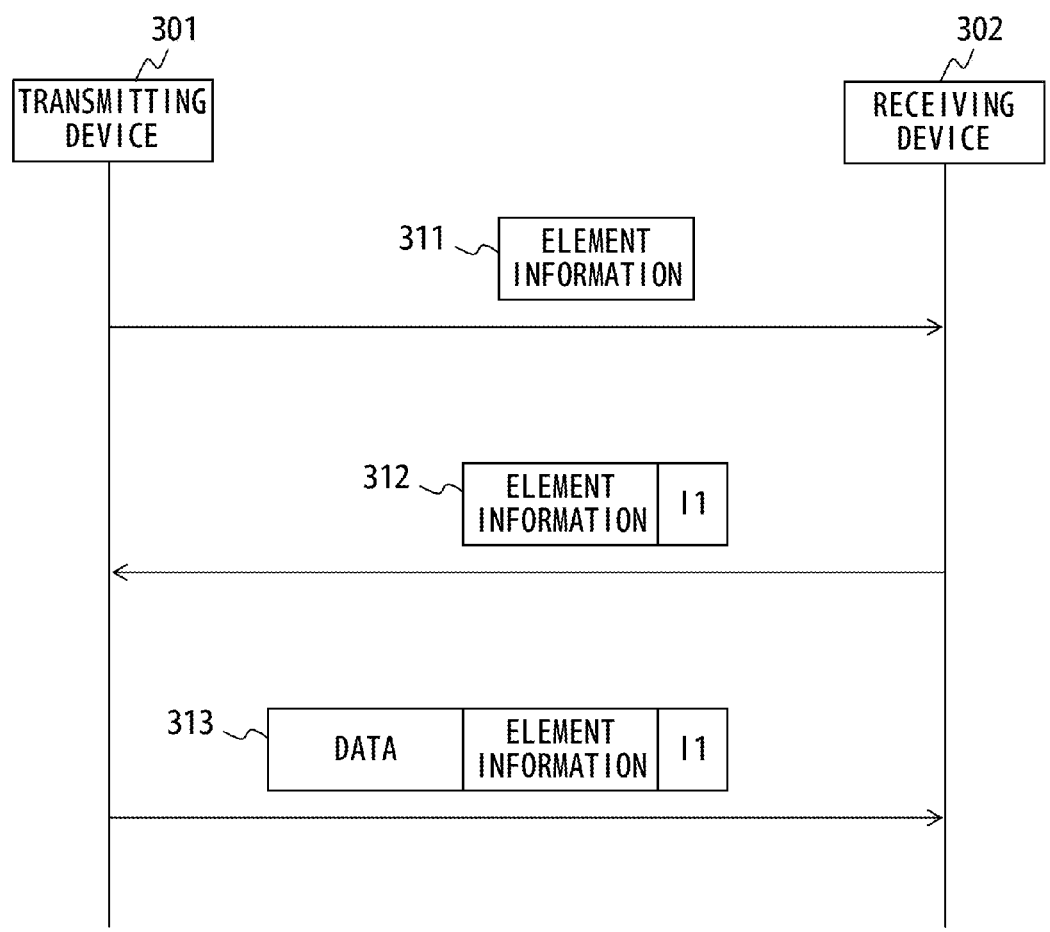
F I G. 3

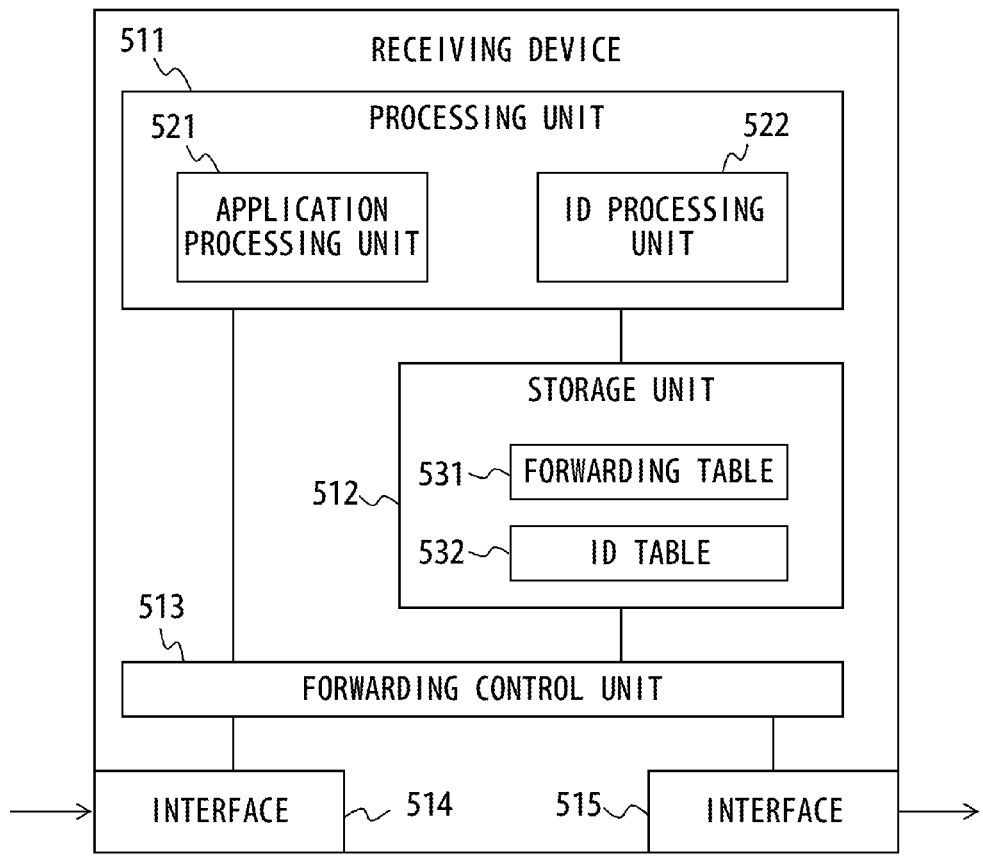
F I G. 5

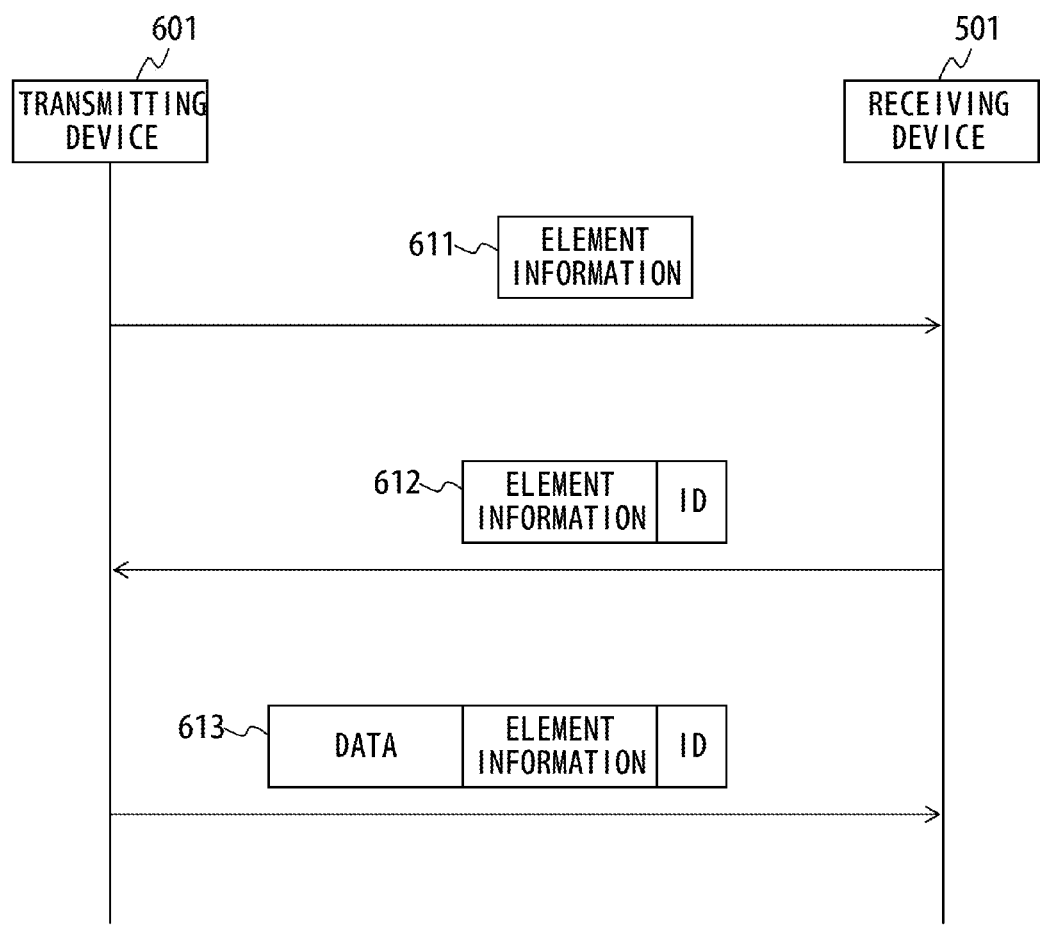
F I G. 6

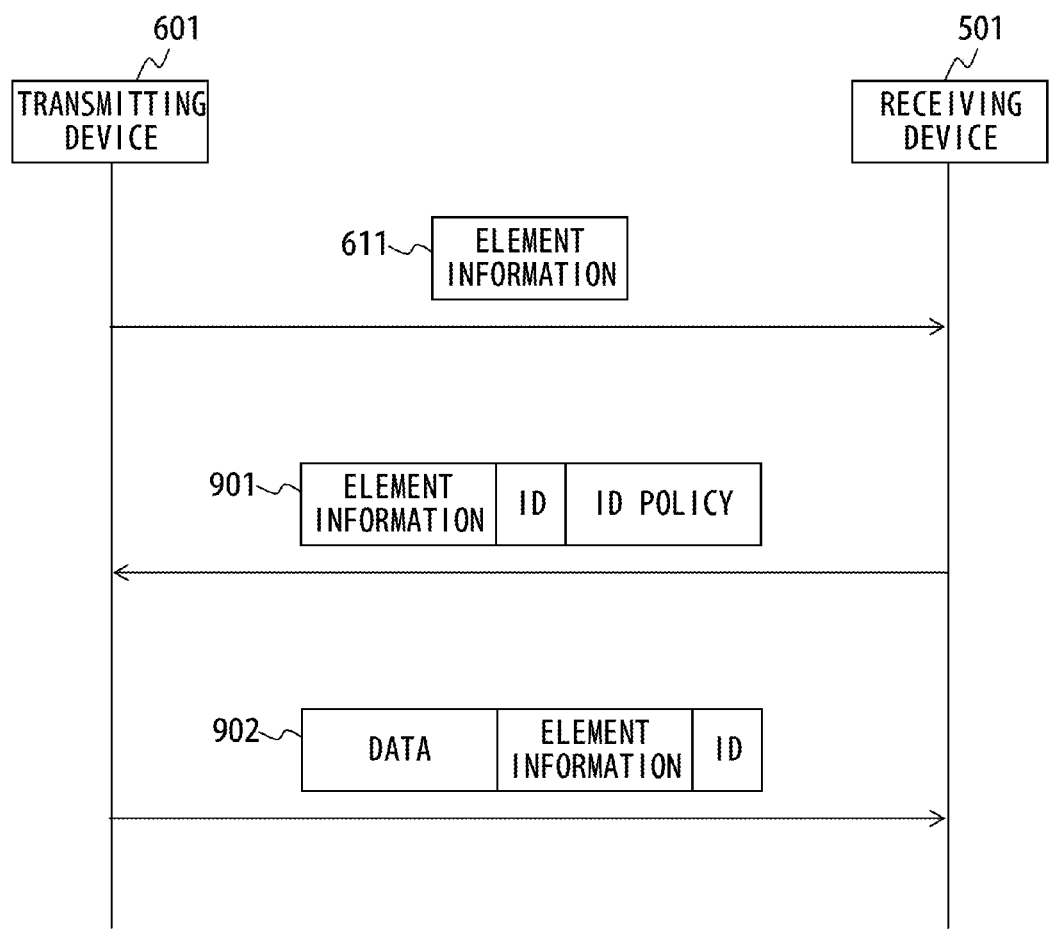
F I G. 9

| ID | ID POLICY |
|---|---|
| ID1 | P1 |
| ID2 | P2 |
| ⋮ | ⋮ |
| IDm | Pm |

F I G. 1 0

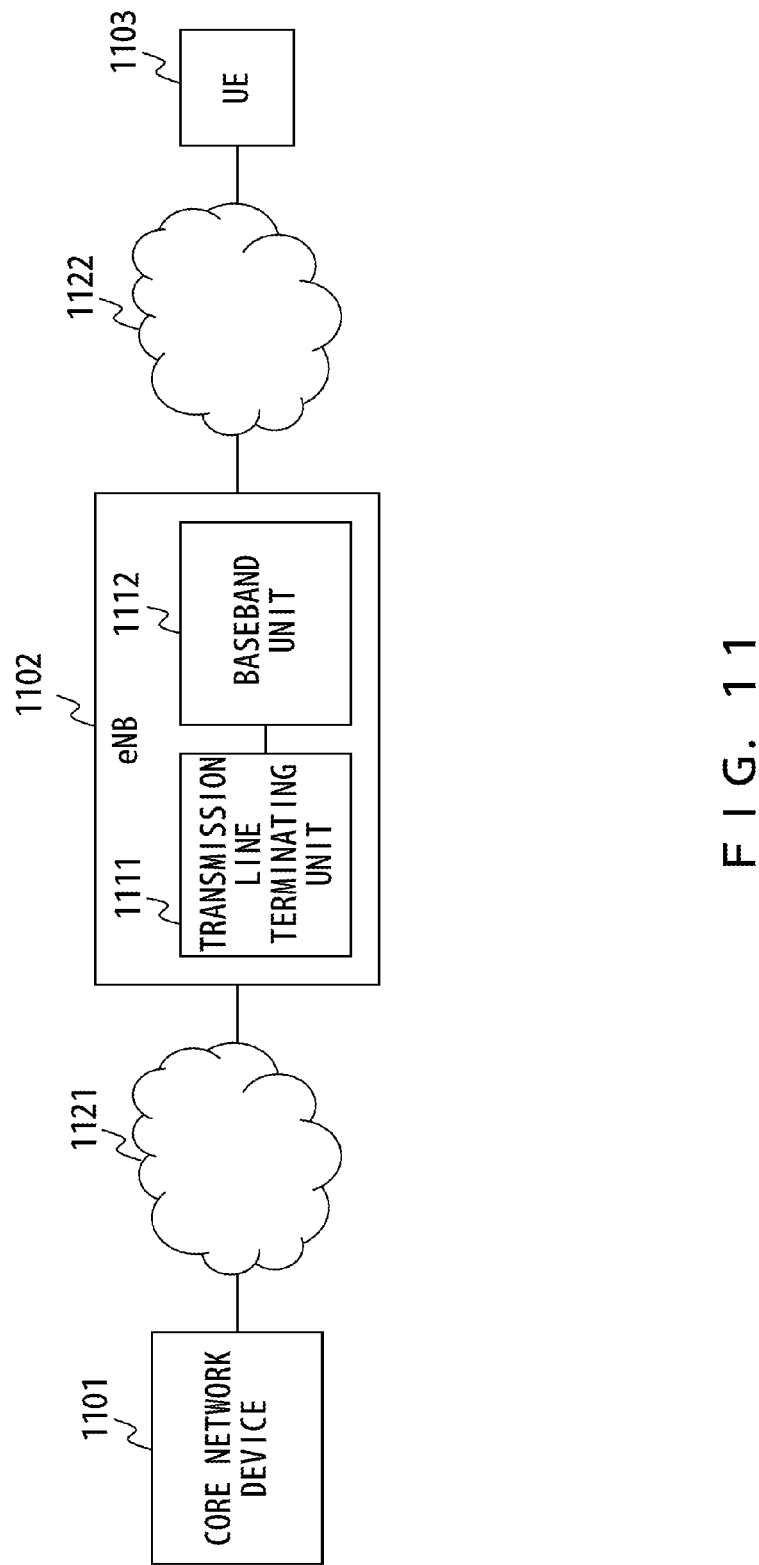
F I G. 11

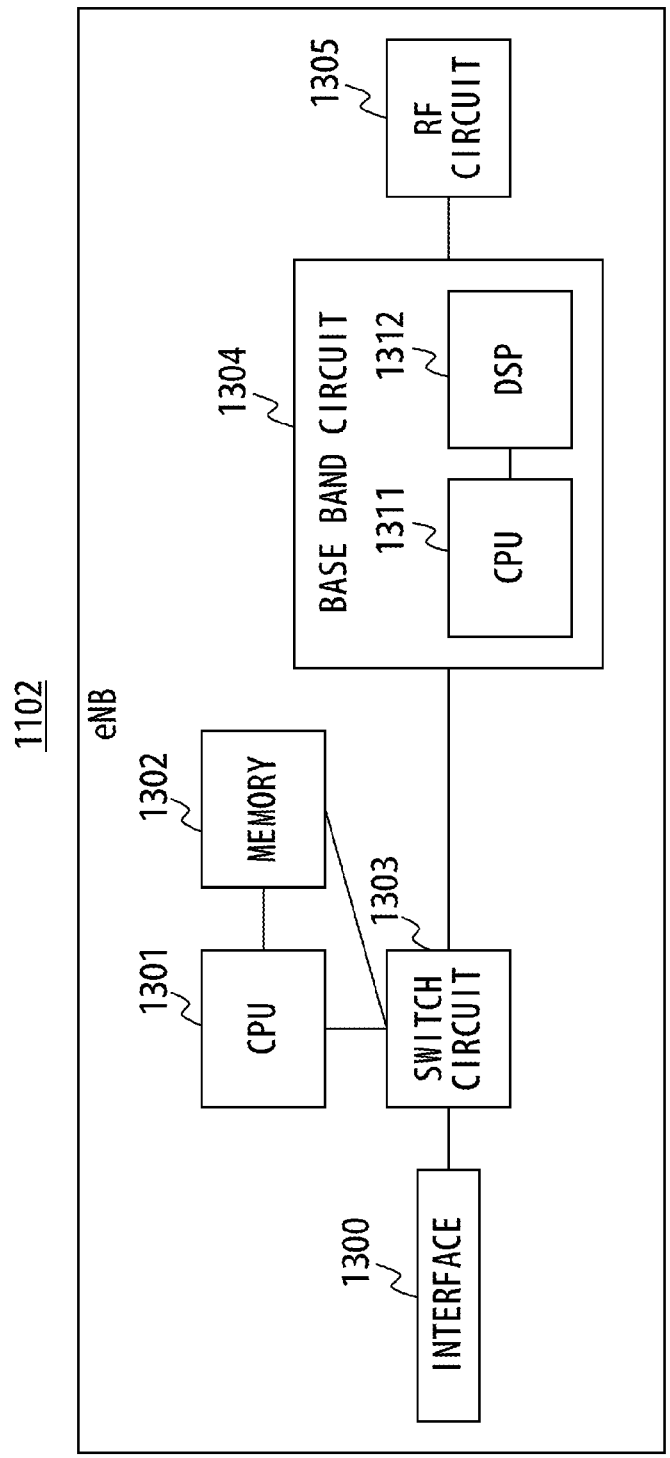
F I G. 13

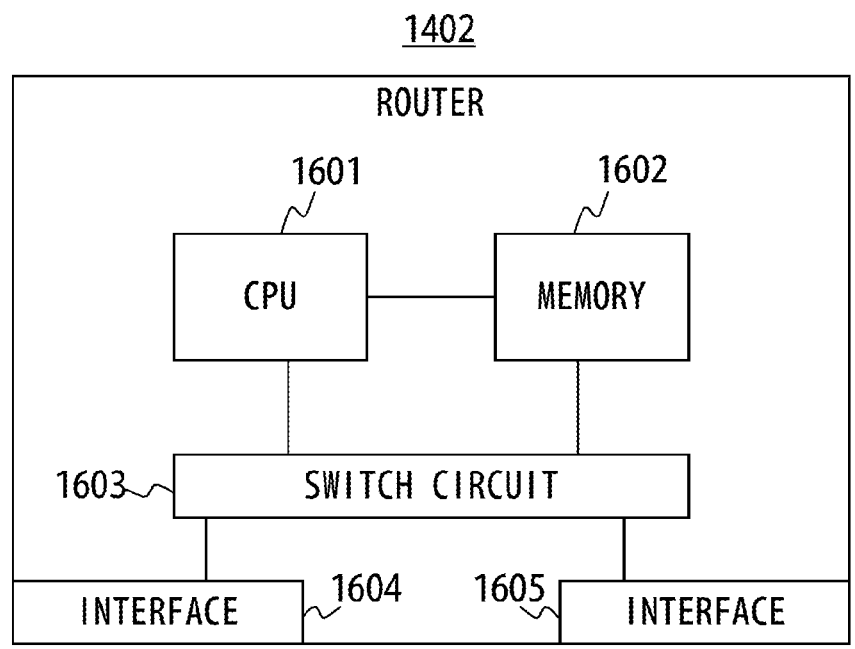
F I G. 16

CONTROL METHOD BY RECEIVING DEVICE, RECEIVING DEVICE, AND COMMUNICATION SYSTEM

CROSS-REFERENCE TO RELATED APPLICATION

This application is based upon and claims the benefit of priority of the prior Japanese Patent Application No. 2014-026099, filed on Feb. 14, 2014, the entire contents of which are incorporated herein by reference.

FIELD

The embodiments discussed herein are related to a control method by a receiving device, a receiving device, and a communication system.

BACKGROUND

A wireless base station device of a wireless communication system may create a signal frame of wireless information on the basis of an IP packet received from an Internet protocol (IP) network. An IP packet includes data to be forwarded to a mobile station and element information for specification of a destination, and a wireless base station device forwards a signal frame including data to the mobile station according to the element information. The element information is, for example, header information included in the IP packet, and includes information such as an IP address, a port number, a protocol identifier, a communication identifier, etc.

In this case, the wireless base station device holds management information for association between the element information and the destination mobile station, and forwards data to a mobile station corresponding to the element information included in the received IP packet. However, since there is a large amount of element information, such as an IP address, etc., the amount of management information becomes enormously large if the number of mobile stations accommodated by the wireless base station device increases.

Then, the wireless base station device provides a forwarding table in which a destination is registered using a hash value of element information as an index, and determines in many cases a destination on the basis of the hash value of the received element information. Using a hash value, the increase of the management information registered in the forwarding table may be suppressed.

There is also a known method of generating a data identifier for identification of data to be forwarded among a plurality of processors (for example, refer to patent document 1). In this method, a data group is extracted in which a processor which uses certain data is different from a processor which generates the data according to the information about the range of the data used by each processor and the information about the range of the data generated by each processor. Then, a data identifier is allocated only to the data of the data group.

Also known is an identification information forwarding system which forwards the identification information of a plurality of packet routes which may be set for each link between nodes adjacent in a packet communication network from a first communication unit to a second communication unit (for example, refer to the patent document 2).

Also known is a duplicate Web site detection device which generates site information by retrieving a content hash value, a site name, and an intra-site path corresponding to each site from Web page information, and detects a duplicate site group according to the site information (for example, refer to the patent document 3).

Patent Document 1: Japanese Laid-open Patent Publication No. 4-205543
Patent Document 2: International Publication Pamphlet No. WO 92/22972
Patent Document 3: Japanese Laid-open Patent Publication No. 2006-215735

SUMMARY

According to an aspect of the embodiments, a control method includes the following processes.

(1) A receiving device associates with the first destination the first one-way function value determined by an operation using a one-way function.

(2) The receiving device determines the second one-way function value by the operation using the one-way function according to the identification information stored in the receiving device and the element information received by the receiving device from a transmitting device.

(3) When the second one-way function value is different from the first one-way function value, the receiving device associates the second one-way function value with the second destination, and returns the identification information to the transmitting device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a forwarding table;
FIG. 3 illustrates a communication system without using hash arithmetic;
FIG. 5 is a configuration of the function of a receiving device;
FIG. 6 illustrates a communication system using an ID;
FIG. 9 illustrates a communication system using an ID and an ID policy;
FIG. 10 illustrates an ID table;
FIG. 11 illustrates a communication system including a wireless base station device;
FIG. 13 illustrates a hardware configuration of a wireless base station device;
FIG. 16 illustrates a hardware configuration of a router.

DESCRIPTION OF EMBODIMENTS

The embodiments of the present invention are described below in detail with reference to the attached drawings.

As described above, a forwarding table in which a destination is registered using the hash value of element information as an index may be provided to suppress the increase in management information registered in the forwarding table in a conventional wireless base station device. In this case, the wireless base station device performs hash arithmetic using the element information included in an IP packet received from an IP network, and determines a destination on the basis of the obtained hash value. Hash arithmetic is a type of operation using a one-way function.

However, since hash arithmetic will stochastically generate the same arithmetic result from a plurality of different information pieces, there is the possibility that the arithmetic result of the hash arithmetic will be duplicated for a plurality of IP packets to be forwarded to different destinations. When the duplication of a hash value occurs, the access frequency to memory in a wireless base station device becomes high, and the process for adjusting the duplication is performed more frequently. Therefore, it is assumed that the forwarding speed of an IP packet will become lower.

Figure 1:
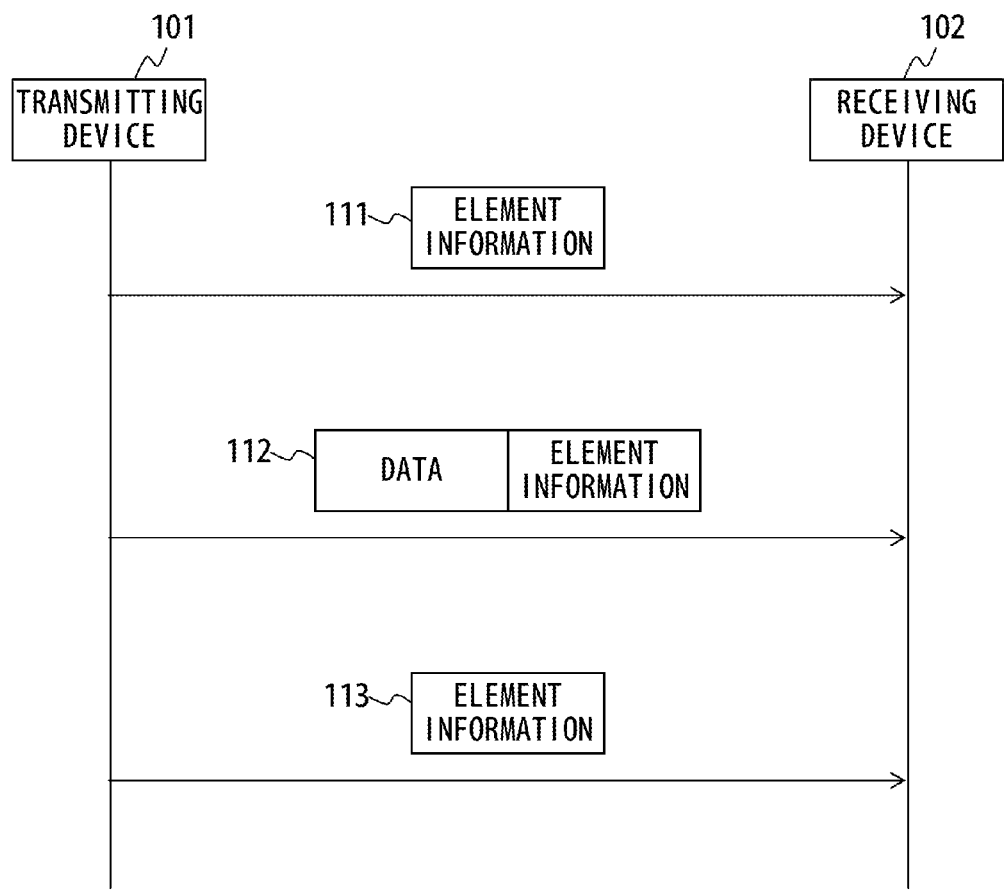
FIG. 1 illustrates a communication system using hash arithmetic.
Figure 2:
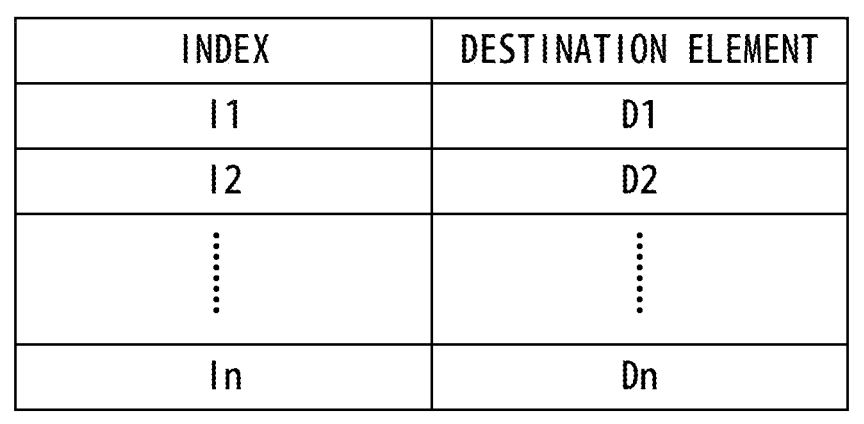

FIG. 1 illustrates an example of a communication system using the above-mentioned hash arithmetic. The communication system in FIG. 1 includes a transmitting device 101 and a receiving device 102, and the receiving device 102 holds a forwarding table as illustrated in FIG. 2. The forwarding table in FIG. 2 is destination information including destination elements D1 through Dn (n is an integer not less than 1) associated with indexes I1 through In. For example, the indexes I1 through In correspond to the storage position in a memory of the receiving device 102.

Destination elements D1 through Dn are control information for forwarding data to a destination. For example, when the receiving device 102 is a wireless base station device, the destination elements D1 through Dn may be the control information of a wireless channel corresponding to the mobile station of a destination.

First, the transmitting device 101 transmits an IP packet 111 including element information to the receiving device 102. The receiving device 102 performs hash arithmetic using the element information included in the received IP packet 111. Then, the receiving device 102 registers the destination element D1 corresponding to the element information in the entry corresponding to the index I1 of a forwarding table using the obtained hash value as the index I1.

Next, the transmitting device 101 transmits an IP packet 112 including the same element information and data as the IP packet 111 to the receiving device 102. The receiving device 102 performs hash arithmetic using the element information included in the IP packet 112, and obtains a destination element D1 from the forwarding table on the basis of the obtained index I1. Then, the receiving device 102 forwards the data included in the IP packet 112 to a corresponding destination using a destination element D1.

At this point in time, only the destination element D1 corresponding to the index I1 is registered in the forwarding table, and destination elements D2 through Dn are not registered.

Next, the transmitting device 101 transmits an IP packet 113 including element information different from that of the IP packet 111 to the receiving device 102. The receiving device 102 performs hash arithmetic using the element information included in the received IP packet 113, but may obtain the same hash value as the index I1.

In this case, since the index of the forwarding table is duplicated between the destination indicated by the IP packet 112 and the destination indicated by the IP packet 113, it is preferable that the receiving device 102 perform a process of identifying two destinations. However, if a process of identifying a destination is added, the forwarding speed of data becomes lower.

Then, there is a method of extending the scope of a hash value generated by hash arithmetic by increasing the number of entries in the forwarding table. In this method, since the number of possible hash values in the hash arithmetic is increased, the probability that the duplication of the hash value will occur for a plurality of different destinations is reduced. However, the number of destinations corresponding to the duplicate hash value (number of duplication) is not limited to being less than a predetermined value.

FIG. 3 illustrates an example of a communication system without using hash arithmetic. The communication system in FIG. 3 includes a transmitting device 301 and a receiving device 302, and the receiving device 302 holds a forwarding table as illustrated in FIG. 2.

First, the transmitting device 301 transmits an IP packet 311 including element information to the receiving device 302. The receiving device 302 registers in the entry corresponding to the index I1 of the forwarding table the destination element D1 corresponding to the element information included in the received IP packet 311.

Next, the receiving device 302 generates an IP packet 312 by adding the index I1 to the element information of the IP packet 311, and returns the IP packet 312 to the transmitting device 301.

Next, the transmitting device 301 transmits to the receiving device 302 an IP packet 313 including the same element information as the IP packet 111, the index I1, and data. The receiving device 302 obtains the destination element D1 from the forwarding table on the basis of the index I1 included in the received IP packet 313. Then, using the destination element D1, the receiving device 302 forwards to a corresponding destination the data included in the IP packet 313.

In this case, since the receiving device 302 may obtain the destination element D1 without the element information, the transmitting device 301 may omit the element information of the IP packet 313.

To prevent indexes of a forwarding table from being duplicated for a plurality of different element information pieces, it is preferable that indexes be provided for the same number of pieces of element information. However, when the amount of the element information is large, the total element information which may be transmitted by the transmitting device 301 is enormously large. Therefore, the number of indexes to be used is also large. Accordingly, there occurs a problem wherein the storage capacity of a memory storing the forwarding table is large.

This problem occurs not only in the case where a wireless base station device forwards an IP packet received from an IP network to a mobile station, but also in the case where a receiving device forwards data received from a transmitting device to a destination in another communication system. A similar problem also occurs when a destination is determined from element information by an operation using a one-way function other than the hash arithmetic.

Figure 4:
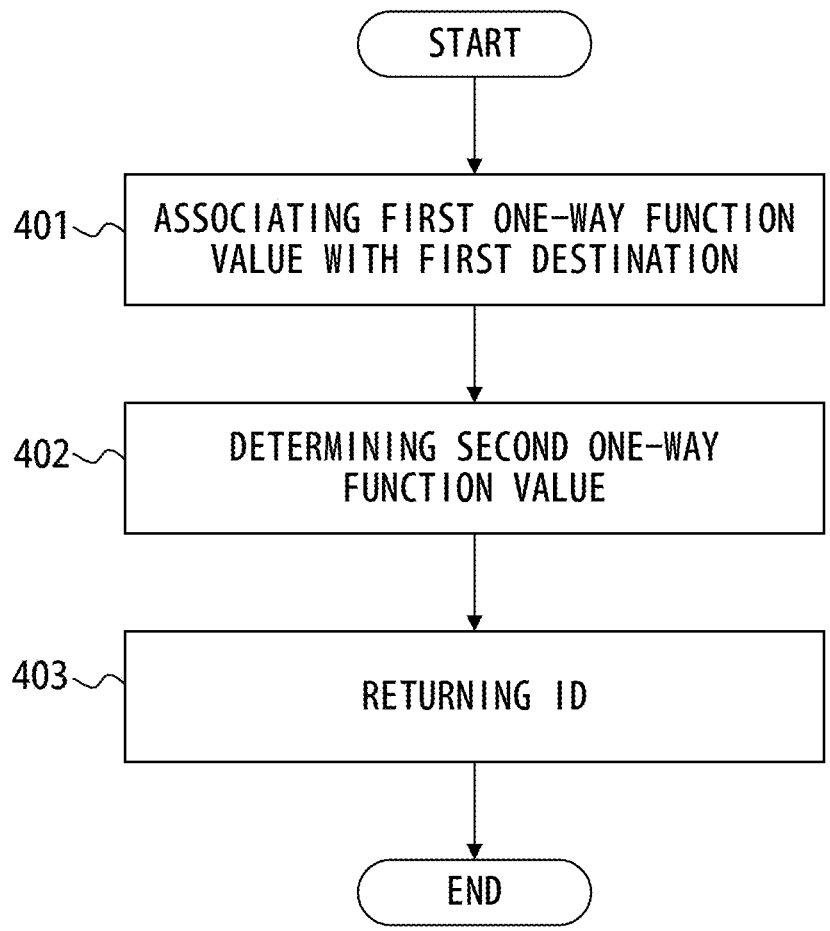
FIG. 4 is a flowchart of a control method performed by a receiving device.

FIG. 4 is a flowchart of an example of a control method performed by a receiving device according to an embodiment of the present invention. First, the receiving device associates with the first destination the first one-way function value determined by an operation using a one-way function (step 401).

Next, the receiving device determines the second one-way function value by the operation using the one-way function from the identification information stored in the receiving device and the element information received by the receiving device from the transmitting device (step 402). When the second one-way function value is different from the first one-way function value, the receiving device associates the second one-way function value with a second destination, and returns the identification information to the transmitting device (step 403).

The above-mentioned control method prevents the duplication of the arithmetic results obtained by the operation using a one-way function from the element information.

The element information may be at least one of, for example, an IP address, a port number, a protocol identifier, a communication identifier, etc. included in an IP packet. A combination of the IP address and the port number of the transmitting device may be used as element information.

Described below is an embodiment in which the operation using a one-way function is hash arithmetic. FIG. 5 is an example of a functional configuration of a receiving device according to an embodiment of the present invention. A receiving device 501 in FIG. 5 includes a processing unit 511, a storage unit 512, a forwarding control unit 513 (forwarding control circuit), an interface 514, and an interface 515. The processing unit 511 includes an application processing unit 521 and an ID processing unit 522.

The interface 514 is connected to a transmitting device through a communication network, and receives data from the transmitting device. The interface 515 forwards data as an interface with another functional unit (for example, a baseband processing unit not illustrated in FIG. 5) in a device, and is connected to another device which forwards data to a destination through a communication network when connected to an external device. That is, the interface 515 forwards data to a destination through another functional unit and another connection device.

The storage unit 512 stores a forwarding table 531 and an ID table 532. The forwarding table 531 has, for example, a configuration as illustrated in FIG. 2, and includes the destination elements D1 through Dn associated with the indexes I1 through In. The ID table 532 includes ID1 through IDm (m is an integer not less than 1) as the identification information (ID) to be used in determining an index of the forwarding table 531 by hash arithmetic.

The application processing unit 521 performs the process of setting a communication path for forwarding data received from a transmitting device to a destination, and the ID processing unit 522 determines the ID corresponding to each destination at an instruction from the application processing unit 521. The ID processing unit 522 notifies the application processing unit 521 of the determined ID, and the application processing unit 521 instructs the forwarding control unit 513 to return the ID to the transmitting device.

At the instruction from the application processing unit 521, the forwarding control unit 513 performs control so that the data received from the transmitting device is to be forwarded to the destination using the destination element of the forwarding table 531. In addition, the forwarding control unit 513 performs control at the instruction from the application processing unit 521 so that the ID is to be returned to the transmitting device.

FIG. 6 is an example of a communication system including the receiving device 501 in FIG. 5. The communication system in FIG. 6 includes a transmitting device 601 and the receiving device 501.

First, the transmitting device 601 transmits an IP packet 611 including element information to the receiving device 501. For example, the IP packet 611 is transmitted to the receiving device 501 as a control packet for setting a communication path. The forwarding control unit 513 of the receiving device 501 extracts element information from the received IP packet 611, and forwards the information to the ID processing unit 522. The ID processing unit 522 performs a destination registering process according to the received element information.

Figure 7:
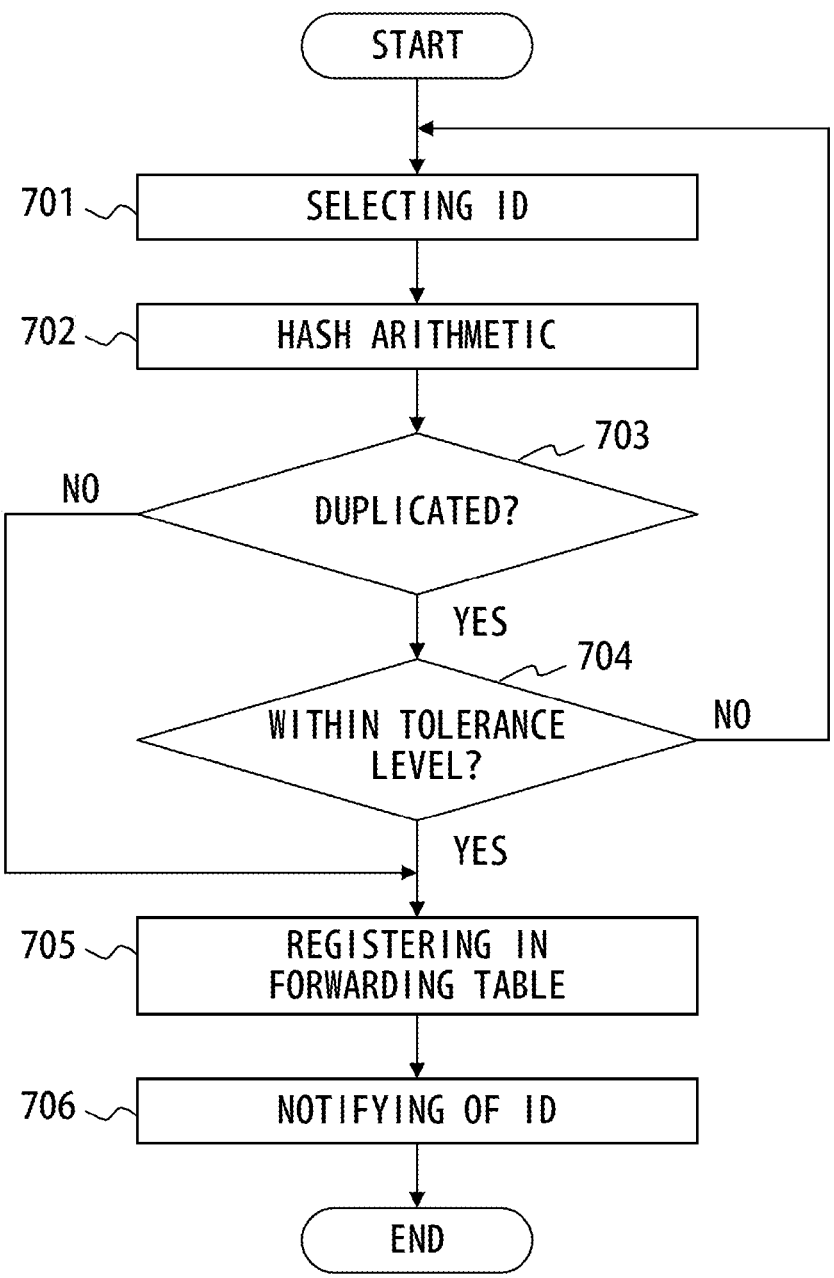
FIG. 7 is a flowchart of a destination registering process.

FIG. 7 is a flowchart of an example of the destination registering process performed by the ID processing unit 522. First, the ID processing unit 522 selects one of the ID1 through IDm included in the ID table 532 (step 701), and obtains a hash value from the element information and its ID by hash arithmetic (step 702).

Next, the ID processing unit 522 checks whether or not the obtained hash value is being used as an index of the forwarding table 531 (step 703). When a hash value is being used as an index (YES in step 703), the ID processing unit 522 judges that the hash value has been duplicated, and judges whether or not the duplication is within a tolerance level (step 704).

The tolerance level may be set by an upper limit on the number of destinations associated with one hash value. The upper limit may be an integer not less than 1. In the forwarding table 531, when the number of destinations associated with the hash value obtained in step 702 is smaller than the upper limit, it is judged that the duplication is within the tolerance level. When the number reaches the upper limit, it is judged that the duplication exceeds the tolerance level.

When the duplication is not within the tolerance level (NO in step 704), the ID processing unit 522 repeats the processes in and after step 701 for another ID.

On the other hand, when the duplication is within the tolerance level (YES in step 704), the ID processing unit 522 registers the destination element corresponding to the element information in the corresponding entry in the forwarding table 531 using the hash value obtained in step 702 as an index (step 705). Then, the ID processing unit 522 notifies the application processing unit 521 of the ID selected in step 701 (step 706).

The application processing unit 521 instructs the forwarding control unit 513 to return the notified ID to the transmitting device. The forwarding control unit 513 generates an IP packet 612 with the ID added to the element information of the IP packet 611, and returns the IP packet 612 to the transmitting device 601.

Unless the obtained hash value is used as an index of the forwarding table 531 (NO in step 703), the ID processing unit 522 judges that the hash value is not a duplicate, and performs the processes in and after step 705.

In step 704, for example, when the upper limit is 1, the number of destinations associated with the obtained hash value has already reached the upper limit. Therefore, it is judged that the duplication constantly exceeds the tolerance level. Accordingly, when the upper limit is 1, the duplication of a hash value is not permitted. On the other hand, when the upper limit is an integer not less than 2, there is a possibility that the number of destinations associated with the obtained hash value will be smaller than the upper limit, and the duplication of the hash value may be permitted. Thus, by setting the upper limit as a desired value, control may be performed so that the duplication of the hash value obtained by hash arithmetic from element information and an ID may be within a tolerance level.

If no destination element is registered in the forwarding table 531 when an IP packet corresponding to the destination element D1 is received and the destination registering process is performed, then the ID processing unit 522 selects, for example, the ID1 included in the ID table 532, and performs hash arithmetic. In this case, since the obtained hash value is not used as an index, the ID processing unit 522 uses the hash value as the index I1, and registers the destination element D1 in the forwarding table 531. Then, the forwarding control unit 513 returns an IP packet including element information and the ID1 to the transmitting device 601.

If only the destination element D1 is registered in the forwarding table 531 when the destination registering process is performed with an IP packet corresponding to the destination element D2 received, then the ID processing unit 522 selects, for example, the ID2 included in the ID table 532, and performs hash arithmetic. If the obtained hash value is equal to the index I1, and the duplication exceeds the tolerance level, then the ID processing unit 522 next selects an ID3.

If the duplication is within the tolerance level, the ID processing unit 522 registers the destination element D2 associated with the index I1 in the forwarding table 531. Then, the forwarding control unit 513 returns the IP packet including the element information and the ID2 to the transmitting device 601.

If the hash value obtained from the ID2 is different from the index I1, the ID processing unit 522 registers the destination element D2 in the forwarding table 531 using the hash value as the index I2. Then, the forwarding control unit 513 returns the IP packet including the element information and the ID2 to the transmitting device 601.

If the destination registering process is performed and the IP packet 612 including the element information and the ID is returned, the transmitting device 601 transmits an IP packet 613 including the element information and the ID of the IP packet 612 and the data to the receiving device 501. The receiving device 501 performs the data forwarding process of forwarding the data of the IP packet 613.

Figure 8:
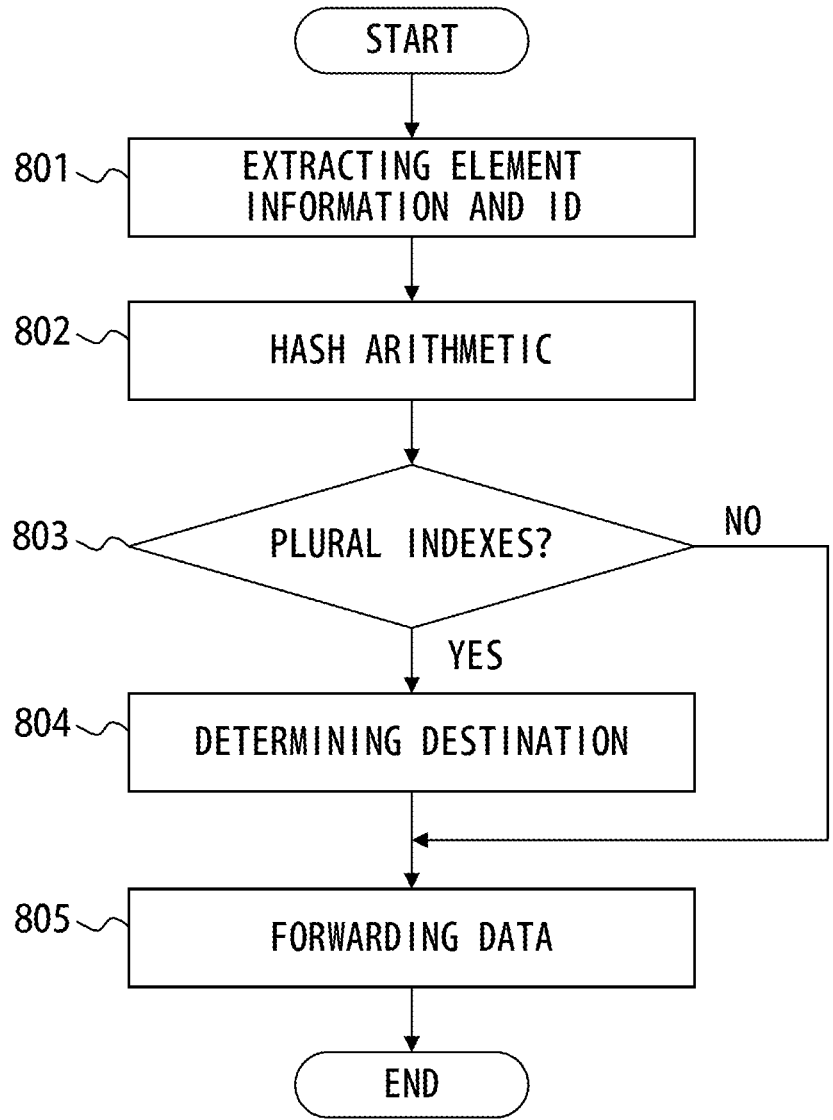
FIG. 8 is a flowchart of a data forwarding process.

FIG. 8 is a flowchart of an example of a data forwarding process performed by the forwarding control unit 513 of the receiving device 501. First, the forwarding control unit 513 extracts the element information and the ID from the received IP packet 613 (step 801), and obtains a hash value from the extracted element information and ID by the hash arithmetic (step 802).

Next, the forwarding control unit 513 checks whether or not there are a plurality of indexes corresponding to the obtained hash value in the forwarding table 531 (step 803). When there are a plurality of indexes equal to the hash value (YES in step 803), the forwarding control unit 513 determines a destination element according to the extracted element information (step 804). Then, the forwarding control unit 513 forwards the data included in the IP packet 613 to the corresponding destination using the destination element (step 805).

On the other hand, if there is only one index equal to the hash value (NO in step 803), then the forwarding control unit 513 extracts the destination element registered in the entry of the forwarding table 531 corresponding to the index. Then, the forwarding control unit 513 forwards the data included in the IP packet 613 to a corresponding destination using the destination element (step 805).

The destination registering process in FIG. 7 is performed each time a control packet for setting a different communication path is received, and a plurality of destination elements corresponding to a plurality of different destinations are registered in the forwarding table 531.

The receiving device 501 in FIG. 5 may be used as a relay device which forwards data with a particular path selected according to, for example, a large volume of element information. In this case, the storage capacity of a memory for storing a forwarding table may be reduced by controlling the duplication of a hash value obtained from element information and an ID within a tolerance level, thereby suppressing the reduction of the forwarding speed, and preventing the degradation of the performance by the duplication of a hash value.

The receiving device 501 may also specify the position at which an ID is added to an IP packet transmitted from the transmitting device 601. FIG. 9 is an example of such a communication system.

First, as in the case in FIG. 6, the transmitting device 601 transmits the IP packet 611 including element information to the receiving device 501, and the ID processing unit 522 of the receiving device 501 performs the destination registering process in FIG. 7 according to the received element information. The storage unit 512 of the receiving device 501 in FIG. 9 stores, for example, the ID table 532 as illustrated in FIG. 10.

The ID table 532 in FIG. 10 includes ID policies P1 through Pm associated with the ID1 through IDm. The ID policies P1 through Pm are information indicating the policies in which an ID is added in the transmission information transmitted from the transmitting device 601, and include the positional information indicating the position to which an ID is added in the transmission information. The positional information may include the leading address and area length of the area to which an ID is added. Furthermore, the ID policies P1 through Pm may include the mode information indicating the method of adding an ID.

An area to which an ID is added may be, for example, a source media access control (MAC) address or a frame check sequence (FCS), which is a field to be added outside an IP packet. It may also be a source port number, which is a field in an IP packet. By adding an ID to an existing field, the ID may be added to transmission information without changing the length of transmission information transmitted from the transmitting device 601.

A method of adding an ID may be, for example, an overwrite or an exclusive OR operation to an area indicated by positional information. The ID policies P1 through Pm may be an ID policy common to the ID1 through IDm or a different ID policy depending on a service provided for a destination.

In step 706 in FIG. 7, with an ID selected from the ID table 532, the ID processing unit 522 notifies the application processing unit 521 of the ID policy associated with the ID. In this case, the forwarding control unit 513 generates an IP packet 901 by adding the ID and the ID policy to the element information of the IP packet 611, and returns the IP packet 901 to the transmitting device 601.

Next, the transmitting device 601 extracts the ID and the ID policy from the received IP packet 901, adds the ID in the manner indicated by the mode information of the ID policy at the position indicated by the positional information, and generates an IP packet 902 including element information, an ID, and data. Then, the transmitting device 601 transmits the IP packet 902 to the receiving device 501.

Next, the receiving device 501 performs the data forwarding process in FIG. 8. In this case, in step 801 illustrated in FIG. 8, the forwarding control unit 513 extracts an ID in the manner indicated by the mode information of the ID policy from the position indicated by the positional information.

For example, when an ID is added by an exclusive OR operation to an FCS in the transmission information, the forwarding control unit 513 calculates the FCS according to the received transmission information. Then, the forwarding control unit 513 may extract the ID by obtaining an exclusive OR between the calculated FCS and the FCS in the transmission information.

Using the ID policy illustrated in FIGS. 9 and 10, an ID may be mapped in a particular field or in an empty field without changing the length of the transmission information.

The transmitting device 601 may transmit the IP packet 611 in FIGS. 6 and 9 as a data packet including data instead of transmitting it as a control packet. In this case, the forwarding control unit 513 of the receiving device 501 determines a destination element according to the element information included in the IP packet 611, and forwards the data included in the IP packet 611 to a corresponding destination using the destination element.

Next, with reference to FIGS. 11 through 16, a concrete example of a communication system using the receiving device 501 in FIG. 5 is described below.

FIG. 11 is an example of a communication system in which the receiving device 501 is applied to a wireless base station device (eNB:eNodeB) in the third generation partnership project (3GPP). The communication system in FIG. 11 includes a core network device 1101, an eNB 1102, and a mobile station (UE) 1103, and the eNB 1102 includes a transmission line terminating unit 1111 and a baseband unit 1112. The core network device 1101 may be, for example, a mobility management entity (MME), a serving gateway (S-GW), etc.

The core network device 1101 and the eNB 1102 mutually communicate through a communication network (IP network) 1121, and the eNB 1102 and the UE 1103 mutually communicate through a wireless section 1122. An S1 interface is defined between the core network device 1101 and the eNB 1102, and a wireless interface is defined between the eNB 1102 and the UE 1103. The transmission line terminating unit 1111 and the baseband unit 1112 in the eNB 1102 mutually communicate through an intra-device signal line.

For example, the core network device 1101 corresponds to the transmitting device 601, and the transmission line terminating unit 1111 corresponds to the receiving device 501. The eNB 1102 accommodates a number of UEs, generates a signal frame of wireless information from the IP packet received from the core network device 1101, and forwards the frame to a particular UE 1103.

Figure 12:
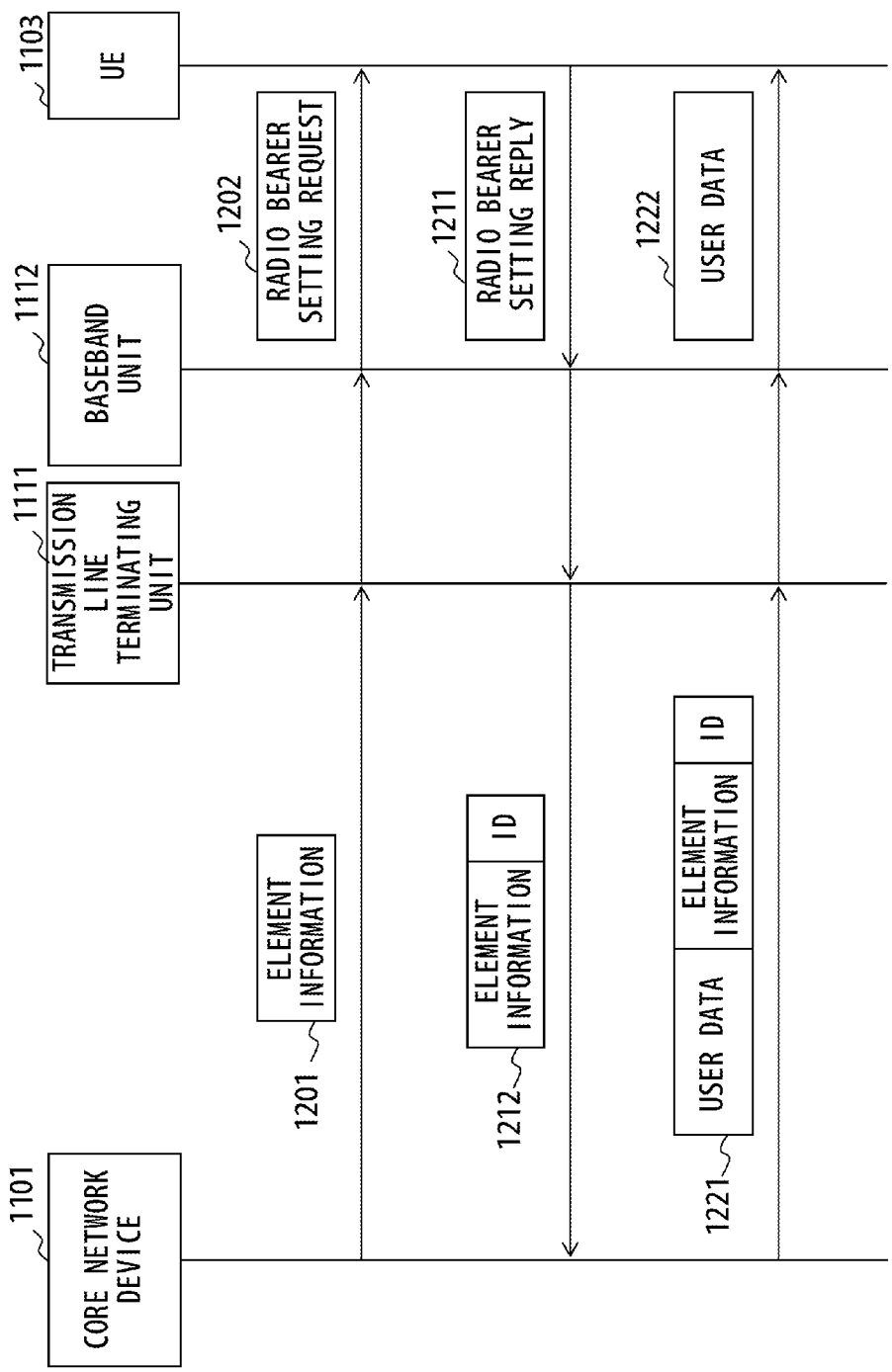
FIG. 12 illustrates data forwarding by a wireless base station device.

FIG. 12 is an example of data forwarding in the communication system in FIG. 11. First, the core network device 1101 transmits an IP packet 1201 including element information to the eNB 1102 as a radio bearer setting request. The transmission line terminating unit 1111 of the eNB 1102 performs a destination registering process in FIG. 7 according to the element information included in the received IP packet 1201, and sets a radio bearer between the eNB 1102 and the UE 1103.

In this case, the transmission line terminating unit 1111 obtains a hash value from the element information and ID of the IP packet 1201. Then, the transmission line terminating unit 1111 registers the destination element corresponding to the UE 1103 in the forwarding table 531 using the obtained hash value as an index. The destination element corresponding to the UE 1103 may be the identification information of the carrier frequency to be used in the forwarding, the identification information of a sector, the identification information of the UE 1103, etc.

Next, the transmission line terminating unit 1111 forwards the radio bearer setting request to the baseband unit 1112, and the baseband unit 1112 transmits a radio bearer setting request 1202 to the UE 1103 through a radio frequency (RF) circuit (not illustrated in FIGS. 11 and 12) in the eNB 1102.

The UE 1103 transmits a radio bearer setting reply 1211 to the radio bearer setting request 1202 to the eNB 1102, and the baseband unit 1112 receives the radio bearer setting reply 1211 through the RF circuit. Then, the baseband unit 1112 forwards the radio bearer setting reply to the transmission line terminating unit 1111.

The transmission line terminating unit 1111 returns to the core network device 1101 an IP packet 1212 including the element information and ID used in the hash arithmetic as a radio bearer setting reply. Thus, a radio bearer in the wireless section 1122 is set, and the core network device 1101 may communicate with the UE 1103 through the eNB 1102.

Then, the core network device 1101 transmits to the eNB 1102 the IP packet 1221 including the element information and ID of the IP packet 1212 and user data. The transmission line terminating unit 1111 of the eNB 1102 performs the data forwarding process in FIG. 8, and forwards the user data of the IP packet 1221 to the baseband unit 1112.

In this case, the transmission line terminating unit 1111 obtains a hash value from the element information and ID of the IP packet 1221, and extracts a destination element registered in the forwarding table 531 using the obtained hash value as an index. Then, the transmission line terminating unit 1111 forwards the destination element to the baseband unit 1112.

The baseband unit 1112 performs the baseband process of controlling a radio channel using the received destination element, and transmits user data 1222 to the UE 1103 through the RF circuit.

With the above-mentioned communication system, the duplication of a hash value obtained from element information and an ID is controlled within a tolerance level, thereby reducing the storage capacity of a memory which stores a forwarding table, and suppressing the reduction of a forwarding speed. Therefore, the degradation of performance by the duplication of a hash value may be avoided.

As illustrated in FIG. 9, the transmission line terminating unit 1111 may include an ID policy in the IP packet 1212 and return the IP packet 1212 to the core network device 1101. In this case, the core network device 1101 generates the IP packet 1221 according to the ID policy of the IP packet 1212.

In FIG. 12, user data is forwarded from the core network device 1101 to the UE 1103, but the receiving device 501 in FIG. 5 may be used in data forwarding in the opposite direction. In this case, for example, a plurality of UEs accommodated in another eNB connected to the core network device 1101 are destinations and the user data is forwarded from the UE 1103 to the core network device 1101.

Then, the baseband unit 1112 and the transmission line terminating unit 1111 respectively operate as the transmitting device 601 and the receiving device 501, and perform data forwarding using element information and an ID through an intra-device signal line.

FIG. 13 is an example of a hardware configuration of the eNB 1102 in FIG. 11. The eNB 1102 in FIG. 13 includes an interface 1300, a central processing unit (CPU) 1301, a memory 1302, a switch circuit 1303, a baseband circuit 1304, and an RF circuit 1305. The baseband circuit 1304 includes the CPU 1311 and the digital signal processor (DSP) 1312.

The interface 1300, the CPU 1301 (processor), the memory 1302, and the switch circuit 1303 correspond to the transmission line terminating unit 1111 in FIG. 11. The interface 1300 corresponds to the interface 514 in FIG. 5, and the switch circuit 1303 corresponds to the storage unit 512, the forwarding control unit 513, and the interface 515. Although it is common to directly connect the switch circuit 1303 with the baseband circuit 1304 for data forwarding to the baseband circuit 1304, it is also possible to make a connection through a different interface such as the interface 515 etc.

The memory 1302 is a read only memory (ROM), a random access memory (RAM), a semiconductor memory such as a flash memory etc., and stores a program and data to be used in processing. The memory 1302 may be used as the storage unit 512. The CPU 1301 operates as the processing unit 511, the forwarding control unit 513, the application processing unit 521, and the ID processing unit 522 by executing a program using the memory 1302.

The baseband circuit 1304 corresponds to the baseband unit 1112 in FIG. 11. The CPU 1311 (processor) performs a process of allocating a frequency band to the UE 1103, and the DSP 1312 performs an encoding process, a modulating process, a decoding process, a demodulating process, etc.

The RF circuit 1305 converts a baseband signal output from the baseband circuit 1304 into an RF signal and transmits the resultant RF signal to the UE 1103, and converts an RF signal received from the UE 1103 into a baseband signal and outputs the resultant baseband signal to the baseband circuit 1304.

Figure 14:
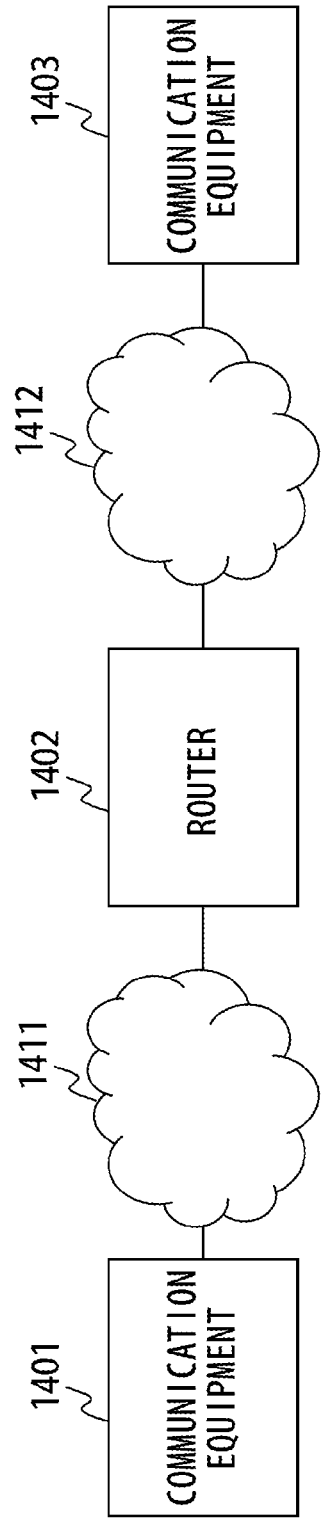
FIG. 14 illustrates a communication system including a router.

FIG. 14 is an example of a communication system in which the receiving device 501 is applied to the router used in the communication network. The communication system in FIG. 14 includes communication equipment 1401, a router 1402, and communication equipment 1403. The communication equipment 1403 may be a user terminal.

The communication equipment 1401 and the router 1402 communicate with each other through a communication network (IP network) 1411, and the router 1402 and the communication equipment 1403 communicate with each other through a communication network (IP network) 1412.

For example, the communication equipment 1401 corresponds to the transmitting device 601, and the router 1402 corresponds to the receiving device 501. The router 1402 accommodates a large number of communication equipment units, and forwards the IP packet received from the communication equipment 1401 to a particular piece of communication equipment 1403.

Figure 15:
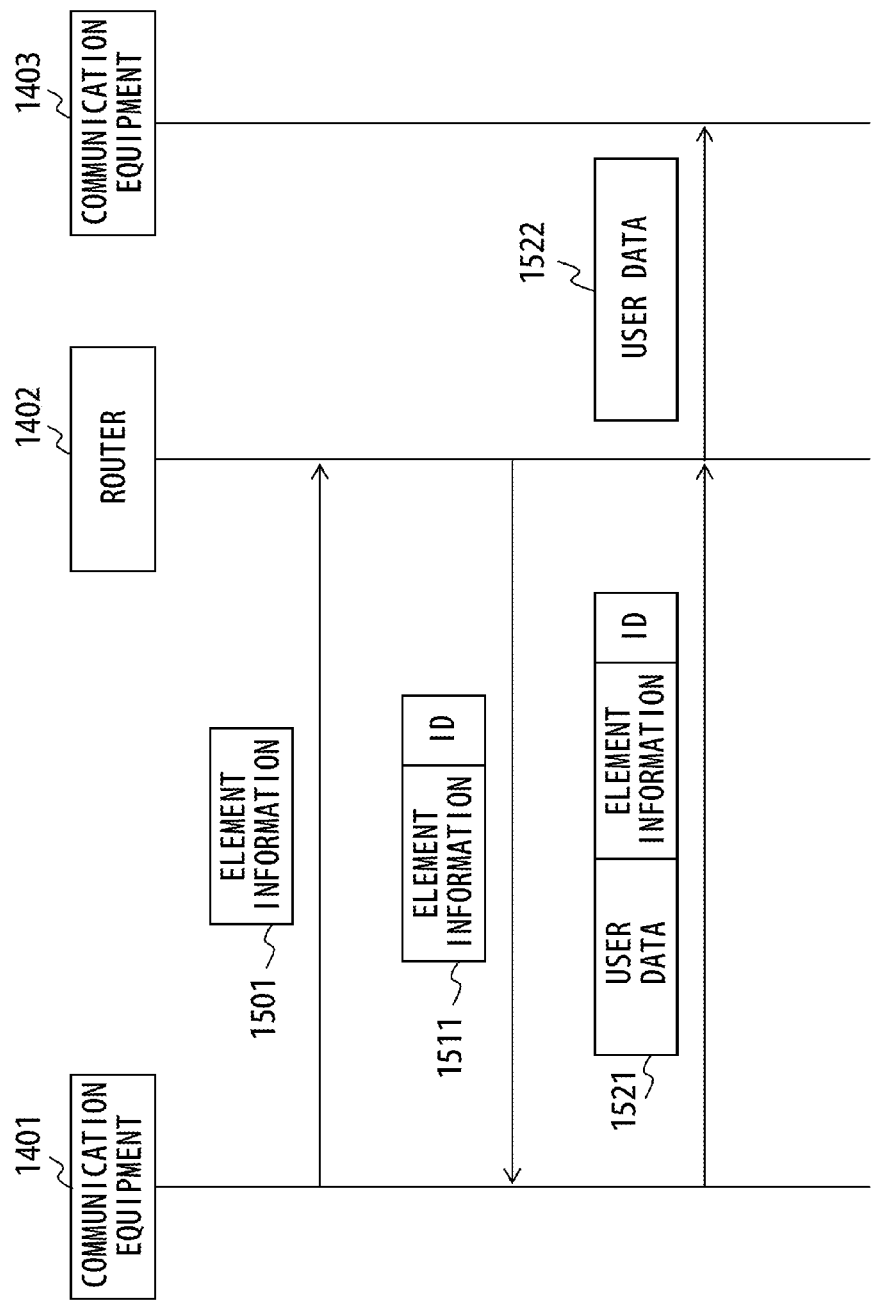
FIG. 15 illustrates data forwarding by a router.

FIG. 15 is an example of data forwarding in the communication system in FIG. 14. First, the communication equipment 1401 transmits an IP packet 1501 including element information as a path setting request to the router 1402. The router 1402 performs the destination registering process in FIG. 7 according to the element information included in the received IP packet 1501, and sets a communication path between the router 1402 and the communication equipment 1403.

In this case, the router 1402 obtains a hash value from the element information and the ID of the IP packet 1501. Then, the router 1402 registers in the forwarding table 531 the destination element corresponding to the communication equipment 1403 using the obtained hash value as an index. A destination element corresponding to the communication equipment 1403 may be, for example, an IP address of the communication equipment 1403, etc.

Next, the router 1402 returns to the communication equipment 1401 an IP packet 1511 including the element information and ID used in the hash arithmetic as a path setting reply. Thus, a communication path between the communication equipment 1401 and the communication equipment 1403 is set, and the communication equipment 1401 may communicate with the communication equipment 1403 through the router 1402.

Then, the communication equipment 1401 transmits to the router 1402 an IP packet 1521 including the element information and ID of the IP packet 1511 and user data. The router 1402 performs the data forwarding process in FIG. 8, and forwards an IP packet 1522 including the user data of the IP packet 1521 to the communication equipment 1403.

In this case, the router 1402 obtains a hash value from the element information and ID of the IP packet 1521, and extracts a destination element registered in the forwarding table 531 using the obtained hash value as an index. Then, the router 1402 performs forwarding control using the destination element, and transmits the IP packet 1522 to the communication equipment 1403.

In the above-mentioned communication system, by performing control so that the duplication of a hash value obtained from element information and an ID may be within a tolerance level in the router, which accommodates a large number of communication equipment units, and so that the storage capacity of the memory which stores a forwarding table may be reduced, reduction of the forwarding speed is suppressed.

As illustrated in FIG. 9, the router 1402 may include an ID policy in the IP packet 1511 and return the packet to the communication equipment 1401. In this case, the communication equipment 1401 generates the IP packet 1521 according to the ID policy of the IP packet 1511.

FIG. 16 is an example of a hardware configuration of the router 1402 in FIG. 14. The router 1402 in FIG. 16 includes a CPU 1601, memory 1602, a switch circuit 1603, an interface 1604, and an interface 1605. The interface 1604 and the interface 1605 respectively correspond to the interface 514 and the interface 515.

The memory 1602 may be, for example, ROM, RAM, or a semiconductor memory such as a flash memory, and stores a program and data used in processing. The memory 1602 may be used as the storage unit 512 in FIG. 5. The CPU 1601 (processor) operates as the processing unit 511, the application processing unit 521, and the ID processing unit 522 in FIG. 5 by executing a program using the memory 1302.

The switch circuit 1603 operates as the forwarding control unit 513 in FIG. 5 using, for example, the forwarding table 531 stored in the memory 1302.

The configurations of the receiving device 501 in FIG. 5, the eNB 1102 in FIG. 13, and the router 1402 in FIG. 16 are only examples, and some of the configuration elements may be omitted or changed depending on the use and condition of the communication system. For example, the application processing unit 521 in FIG. 5 may be provided outside the receiving device 501. In the eNB 1102 in FIG. 13, a plurality of RF circuits 1305 may be provided.

The forwarding table in FIG. 2 and the ID table in FIG. 10 are only examples, and some of the information may be omitted or changed depending on the configuration and condition of the communication system. For example, when no ID policy is used, the ID policies P1 through Pm may be omitted in the ID table in FIG. 10.

The flowcharts in FIGS. 7 and 8 are only examples, and some of the processes may be omitted or changed depending on the configuration and condition of the communication system. For example, when the duplication of a hash value is not permitted in a forwarding table, the process in step 704 in FIG. 7 and the processes in step 803 and step 804 in FIG. 8 may be omitted. In this case, the ID processing unit 522 repeats the processes in and after step 701 on another ID if the hash value is a duplicate (YES in step 703). The forwarding control unit 513 performs the process in step 805 immediately after the process in step 802.

In step 702 in FIG. 7 and step 802 in FIG. 8, an operation by another one-way function may be used instead of hash arithmetic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method, comprising:
    associating, by a receiving device, a first one-way function value determined by an operation using a one-way function with a first destination;
    determining a second one-way function value by the operation using the one-way function from identification information stored in the receiving device and element information received by the receiving device from a transmitting device;
    associating the second one-way function value with a second destination and returning the identification information from the receiving device to the transmitting device when the second one-way function value is different from the first one-way function value; and
    associating the first one-way function value with the second destination and returning the identification information to the transmitting device when the second one-way function value is equal to the first one-way function value and a number of destinations associated with the first one-way function value is smaller than a prescribed number.

2. The control method according to claim 1, further comprising:
    receiving data in which the identification information and the element information are added, from the transmitting device; and
    forwarding the data to the second destination associated with the second one-way function value, wherein
    the determining the second one-way function value determines the second one-way function value by the operation using the one-way function from the identification information and the element information added to the data.

3. The control method according to claim 1, wherein
    the returning the identification information from the receiving device to the transmitting device returns positional information, which indicates a position where the identification information is added in transmission information transmitted from the transmitting device, with the identification information to the transmitting device.

4. The control method according to claim 1, further comprising
    forwarding received data to the second destination according to the element information added to the received data when the data to which the element information is added is received by the receiving device from the transmitting device before associating the second one-way function value with the second destination.

5. A receiving device, comprising:
    a memory which stores destination information associating a first one-way function value determined by an operation using a one-way function with a first destination; and
    a processor which determines a second one-way function value by the operation using the one-way function from identification information stored in the receiving device and element information received by the receiving device from the transmitting device, and
    associates the second one-way function value with a second destination and returns the identification information to the transmitting device when the second one-way function value is different from the first one-way function value, wherein when the second one-way function value is equal to the first one-way function value and a number of destinations associated with the first one-way function is smaller than a prescribed number, the processor associates the first one-way function value with the second destination, and returns the identification information to the transmitting device.

6. The receiving device according to claim 5, further comprising
    a forwarding control circuit which determines the second one-way function value by the operation using the one-way function from the identification information and the element information added to data when the data to which the identification information and the element information are added is received from the transmitting device, and forwards the data to the second destination associated with the second one-way function value.

7. The receiving device according to claim 5, wherein
    the processor returns positional information indicating a position where the identification information is added in transmission information transmitted from the transmitting device to the transmitting device with the identification information.

8. The receiving device according to claim 5, further comprising
    a forwarding control circuit which forwards received data to the second destination according to the element information added to the received data when the data to which the element information is added is received by the receiving device from the transmitting device before the second one-way function value is associated with the second destination.

9. A communication system including a transmitting device and a receiving device,
    wherein the transmitting device transmits element information to the receiving device, and
    the receiving device comprises:
    a memory which stores destination information associating a first one-way function value determined by an operation using a one-way function with a first destination; and
    a processor which determines a second one-way function value by the operation using the one-way function from identification information stored in the receiving device and element information received by the receiving device from the transmitting device, and associates the second one-way function value with a second destination and returns the identification information to the transmitting device when the second one-way function value is different from the first one-way function value;
wherein when the second one-way function value is equal to the first one-way function value and a number of destinations associated with the first one-way function is smaller than a prescribed number, the processor associates the first one-way function value with the second destination, and returns the identification information to the transmitting device.

* * * * *